United States Patent [19]

Carden

[11] 4,304,993
[45] Dec. 8, 1981

[54] SOLAR ENERGY COLLECTION SYSTEM

[76] Inventor: Peter O. Carden, Canberra, Australia

[21] Appl. No.: 1,191

[22] Filed: Jan. 5, 1979

Related U.S. Application Data

[60] Division of Ser. No. 799,234, May 23, 1977, Pat. No. 4,158,354, which is a continuation-in-part of Ser. No. 618,633, Oct. 1, 1975, abandoned.

[30] Foreign Application Priority Data

Oct. 4, 1974 [AU] Australia .............................. PB9168
Jul. 29, 1975 [AU] Australia .............................. PC2558

[51] Int. Cl.³ ................................................ G01J 1/20
[52] U.S. Cl. ................................. 250/203 R; 126/425
[58] Field of Search ............ 250/203, 209, 578, 237 R; 126/424, 425

[56] References Cited

U.S. PATENT DOCUMENTS 3,070,699 12/1962 Lehmann et al. ............... 250/203 R
3,780,966 12/1973 Newcomb et al. ............. 250/203 R

*Primary Examiner*—David C. Nelms
*Attorney, Agent, or Firm*—Fleit & Jacobson

[57] ABSTRACT

A solar energy collection system utilizing a fluid which dissociates endothermically and recombines exothermically is described. The preferred fluid is ammonia. Solar radiation is focussed onto absorber-reaction vessels from many paraboloidal mirrors. Means for electronically controlling the orientation of the mirrors is described. The mirrors may close together to reduce the effects of adverse climatic conditions.

7 Claims, 16 Drawing Figures

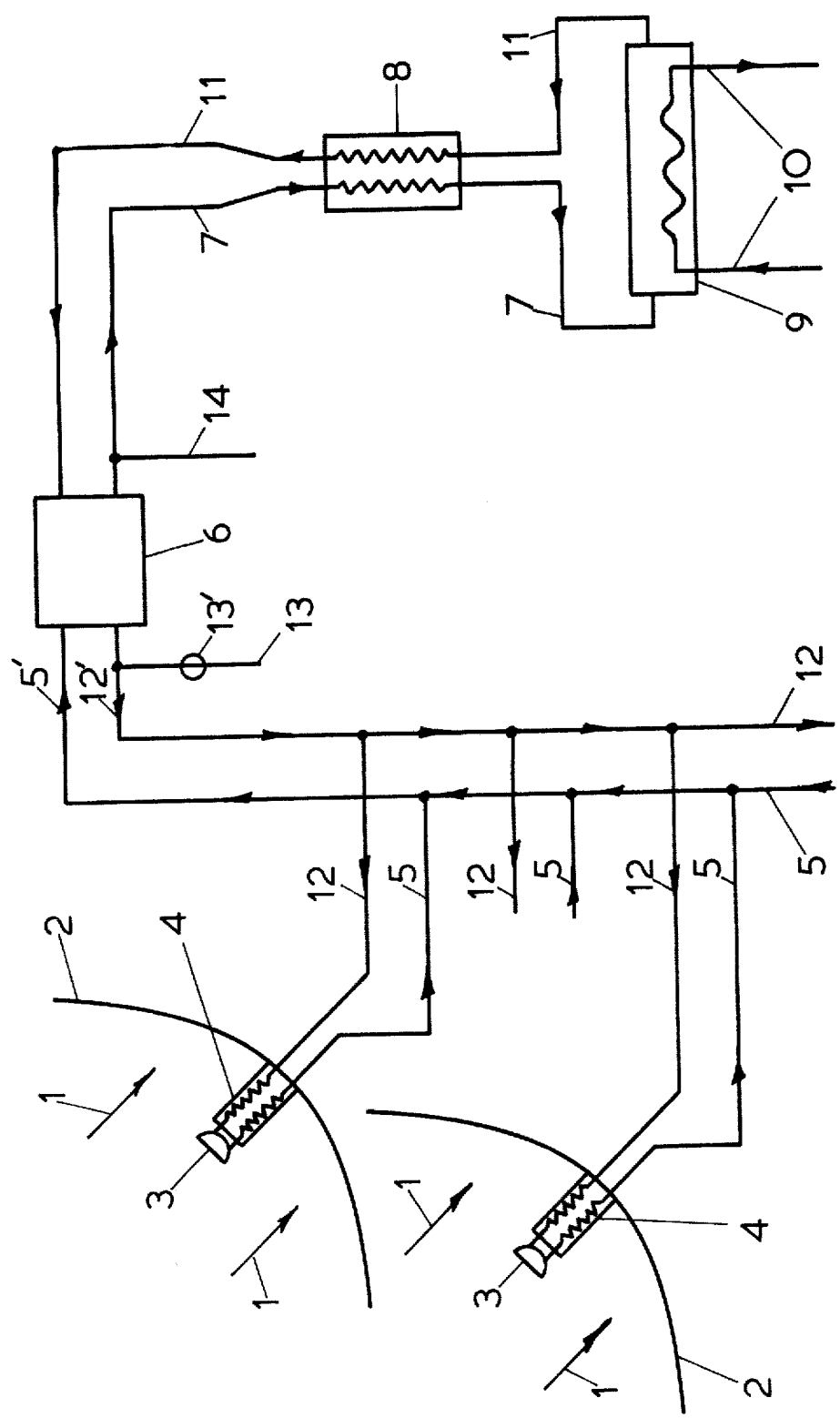

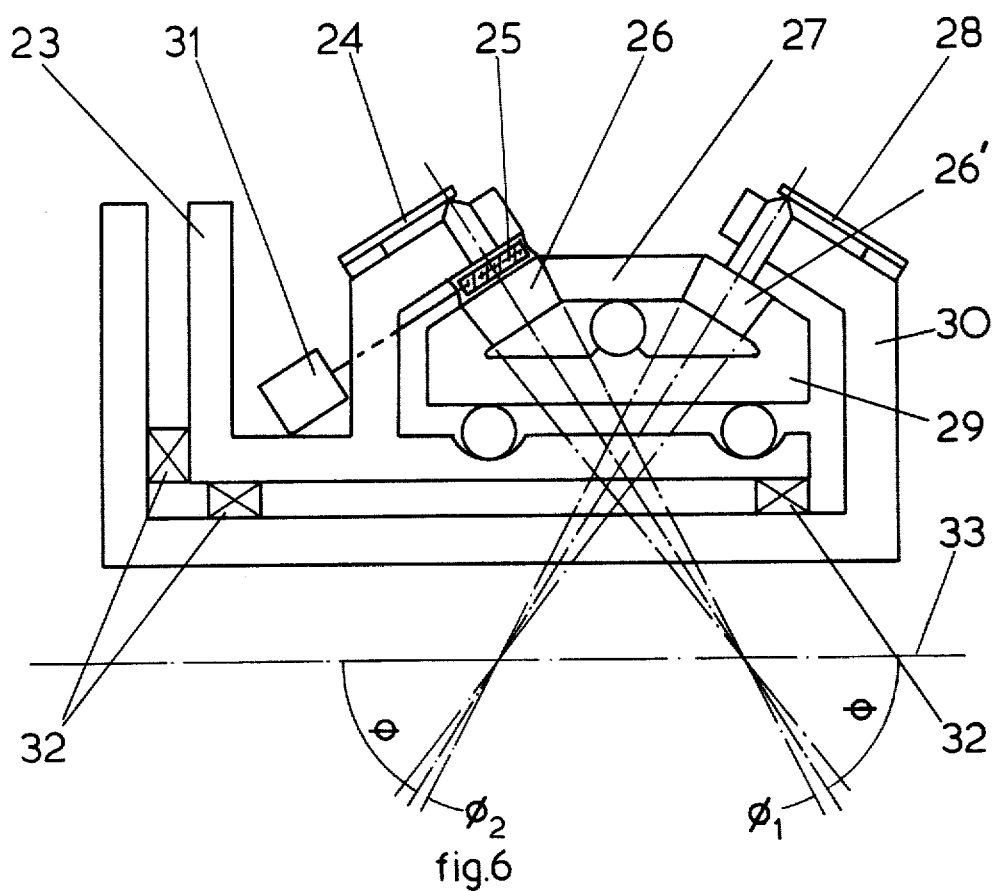
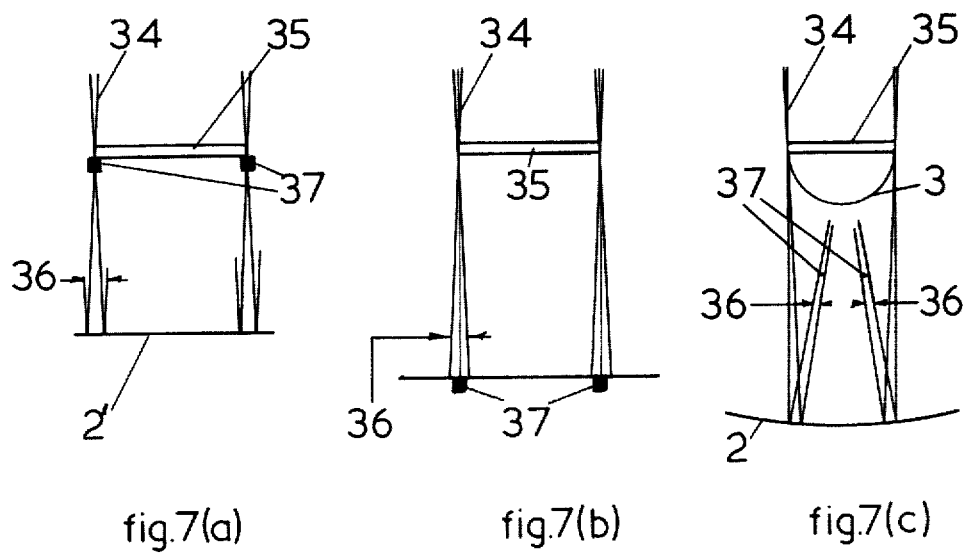

SOLAR ENERGY COLLECTION SYSTEM

This is a divisional of application Ser. No. 799,234, filed May 23, 1977, now U.S. Pat. No. 4,158,354, which is a continuation-in-part of application Ser. No. 618,633, filed Oct. 1, 1975, now abandoned.

This invention relates to the utilisation of solar energy. In particular the invention is concerned with means and methods of collecting solar radiation over relatively large areas of land desirably employing a plurality of paraboloidal mirrors.

Two main problems in the large scale utilisation of solar energy by technological means are the collection of radiation over large areas and the corradiation or gathering together of the collected energy to a central point. One study group (Honeywell, 1974) ("Dynamic conversion of solar generated heat to electricity" N.A.S.A. Contract No. NAS 3-18014. Progress narrative No. 6 (1974). Honeywell-Minneapolis Inc.) has indicated that corradiation by means of heated fluids in pipes is uneconomical for fluid temperatures above 300° C. and that systems without any optical corradiation are not competitive.

BACKGROUND OF THE INVENTION

Prior art methods of collecting and gathering solar energy over large areas of land include the following:

(1) Solar energy is collected by hot plate absorbers in which solar energy is converted to heat. The heat either boils a liquid or raises the temperature of a fluid, and by corradiation in either case this hot fluid, energy is brought to a common heat recovery plant.

(2) Solar energy is collected by means of parabolic or paraboloidal mirrors and is converted to heat in a focal absorber in which either the temperature of a fluid is raised or a liquid is boiled. In either case the hot fluid is corradiated as in (1). (3) Solar energy is collected by flat mirrors or near flat mirrors by means of which the radiant energy is redirected to a common focal absorber usually elevated. The heat energy is recovered from the absorber by means of a heat exchanging fluid.

SUMMARY OF THE INVENTION

According to this invention there is provided a solar energy collection system in which a fluid dissociates endothermically and subsequently recombines exothermically into an undissociated fluid, comprising:

(a) means for introducing said undissociated fluid, at elevated temperature, into an absorber-reaction vessel.

(b) means for focussing solar radiation onto the absorber-reaction vessel, (c) means operable from a master control for controlling the orientation of the means for focussing solar radiation, (d) means for conducting the fluid from the absorber-reaction vessel through a first counterflow heat exchanger to effect cooling, (e) means for conducting the fluid to a reaction chamber wherein partial recombining of the dissociated products occurs with release of heat energy, (f) a separator for separating undissociated fluid and dissociated fluid, (g) means for returning dissociated fluid to the reaction chamber, (h) means for returning undissociated fluid to the first heat exchanger so as to heat it prior to entry into the absorber-reaction vessel, (i) means for maintaining the fluid at superatmospheric pressure, (j) means for recovering heat energy from the reaction chamber.

In the above context, a fluid which dissociates is a fluid a component of which undergoes dissociation into simpler constituents, the whole, however, remaining fluid. The simpler constituents subsequently recombine to form the undissociated fluid having the same composition as the original fluid.

Desirably, a second counterflow heat exchanger located adjacent to the reaction chamber is provided for heating the fluid entering the reaction chamber and cooling the fluid leaving the reaction chamber.

The separator may be located in the system so that it only receives cooled fluid from the second counterflow heat exchanger or it may be located so that it also receives cooled fluid from the second counterflow heat exchanger.

In a preferred aspect this invention provides a solar energy collection system comprising:

(a) an absorber-reaction vessel whose outside surface receives concentrated solar energy which energy is converted to, and conducted through the vessel walls as, heat, and wherein the heat subsequently passes to the said fluid and is absorbed in the said endothermic chemical process.

(b) means for introducing a stream of an ammonia rich fluid comprising ammonia, nitrogen and hydrogen into an absorber-reaction vessel, (c) means for focussing solar radiation onto the said absorber-reaction vessel so as to cause some of the ammonia to dissociate into nitrogen and hydrogen, (d) means electronically controlled from a master control for controlling the orientation of the means for focussing solar radiation, (e) means for conducting the resulting mixture of ammonia, hydrogen and nitrogen from the absorber-reaction vessel through a first counterflow heat exchanger so as to cool the said resulting mixture, (f) means for conducting the said resulting mixture to a separator for separating the said resulting mixture into an ammonia rich fluid component and a nitrogen and hydrogen rich fluid component, (g) means for conducting the nitrogen and hydrogen rich fluid component through a second counterflow heat exchanger so as to heat the said component, into a reaction chamber so as to cause some of the nitrogen and hydrogen to react and form ammonia, (h) means for recovering some of the heat of reaction, (i) means for conducting the resulting fluid from the reaction chamber through the second counterflow heat exchanger to cool the said fluid, (j) means for returning the cooled fluid from the second counterflow heat exchanger to the separator, (k) means for conducting the ammonia rich fluid from the separator to the first counterflow heat exchanger so as to heat the stream of fluid prior to introducing the said stream into the absorber-reaction vessel, (l) means for ensuring that the fluid is maintained at superatmospheric pressure.

The means for focussing solar radiation onto the absorber-reaction vessel may comprise a plurality of paraboloidal mirrors. Fresnel mirrors or lenses may also be used. Desirably, the paraboloidal mirrors are of pressed steel construction.

In the foregoing a master control is a device (or assembly of devices) which is communicatively linked to the said means for controlling the orientation of said means for focussing solar radiation, and which, through the transmission and reception of information, controls in a supervisory manner, the said means for controlling orientation.

Systems according to the present invention possess some of the following advantages:

(a) the energy is corradiated from the collectors at reduced temperatures (preferably about ambient) thus reducing the need for thermal insulation of the conducting means, (b) the focussing means may be orientated directly towards the sum or under adverse conditions may be orientated to a position where damage is minimized, (c) as operating temperatures will generally be not higher than about 800° C. suitable materials of construction are readily available and economical.

DESCRIPTION OF THE PREFERRED EMBODIMENTS

Some preferred aspects of the invention are described with reference to the drawings. It is emphasised that the drawings are diagrammatic and not intended to be limitative of the invention. In the drawings:

FIGS. 1 and 1(a) illustrate a preferred layout of the energy transfer and fluid circulation system of the invention, FIG. 2 illustrates a part sectional view of an absorber-reaction vessel with an associated first heat exchanger, FIG. 3 depicts a cross-section of the tubing of a first counter current heat exchanger, FIG. 4 shows a still further arrangement of the tubing of the first counter current heat exchanger, FIG. 5 illustrates schematically the components of the means operable from a master control for controlling the orientation of the focussing means, FIG. 6 illustrates part of the means illustrated in FIG. 5, viz item 46 i.e., a friction-driven planetary speed reduction unit and rotary actuator, FIGS. 7(a), 7(b) and 7(c) each illustrate another part of the means illustrated in FIG. 5, viz item 60, i.e. a sunpointing error sensor, FIG. 8 indicates the function of, and interrelationship between, the programs for the computer 47 shown in FIG. 5, FIG. 9 illustrates the means for focussing solar radiation onto the absorber-reaction vessel, viz. two mirrors each oriented towards the sun shown here in elevation view, FIG. 10 is an elevation view of the two mirrors of FIG. 9 orientated so as to provide mutual shelter for their reflective surfaces, FIG. 11 is a plan view of the mirrors in FIG. 10, FIG. 12 illustrates a preferred absorber-reaction vessel, FIG. 13 is a section along A—A of FIG. 12.

Solar energy (1) is collected by means of a large number of paraboloidal pressed steel mirrors (2) of about 10 m² aperture area each.

For the sake of illustration only two such mirrors are shown, in FIG. 1. The method of connecting others is described later in this specification.

At the focus of each mirror is an absorber-reaction vessel (3) in which high pressure (viz. above 100 atmospheres) ammonia gas undergoes chemical dissociation into hydrogen and nitrogen. This reaction is endothermic the heat of reaction being provided by the absorbed solar energy. The temperature of the absorber-reactor vessel is maintained substantially constant at a temperature within a range of about 500-800° C., preferably about 700° C. by adjusting the flow of ammonia. The incoming ammonia (12) and outgoing hydrogen and nitrogen (5) pass through a counterflow heat exchanger (4) desirably mounted on the mirror and by this means it is possible for the nitrogen and hydrogen (5) emerging from the heat exchanger to be practically at ambient temperature the same as the incoming ammonia (12). Thus through the flow of gases into and out of the mirror assembly energy may be transferred from it in simple pipes needing no thermal insulation.

The nitrogen and hydrogen leaving through conduits (5) may also contain undissociated ammonia and this desirably passes into a separator (6) (as shown in FIG. 1) whose function is to regroup the components of the mixtures emanating from the dissociation and synthesising reactors into the two appropriate feedstocks. By providing a separator one avoids the need for the reaction $2NH_3 \rightleftharpoons N_2 + 3H_2$ to proceed to substantial completion in either reactor and thus removes some of the constraint that would otherwise be imposed on the reactor temperatures. Indeed there is no barrier, in principle, against the two reactor temperatures being equal, or even against the synthesis temperature being greater than the dissociation temperature. However the energy requirements of the separator prevent any overall advantage accruing from the latter situation, at least from the point of view of efficient energy transmission.

The separated nitrogen and hydrogen is passed through a common counterflow heat exchanger (8) in which the temperature is raised to approximately 400-500° C., preferably about 450° C. The gases then pass through a reaction chamber (9) where partial recombination to ammonia takes place. This reaction is exothermic the heat produced from it being approximately equal to all the solar energy originally collected by the mirrors. The gases emerging from the reaction chamber pass through the heat exchanger (8) and are consequently cooled to approximately ambient temperature. As a result some ammonia liquefies and this is easily separated in (6) from the uncombined nitrogen and hydrogen which is recycled through the heat exchanger (8) to the reaction chamber (9).

The heat exchanger (8) and reaction chamber (9) may be thermally coupled to the working fluid (10) of a heat engine (for example a Rankine steam cycle or a Stirling hydrogen cycle) whereby mechanical or subsequently electrical power may be extracted. When the whole system is operated virtually at constant superatmospheric pressure, the only compressor or pump needed is a small one for initial charging and for making up leakage, e.g. 13' in FIG. 1. A circulating pump may be provided for the synthesis loop and another for the corradiation system. The latter pump may be used to adjust the flow of ammonia to the aforesaid requirements of absorber reactor temperature provided equality of flow through the absorber-reactor vessels has been assured, either through appropriate selection of sizes of conduits 5 and 12 or through the use of fixed constrictions or values. Individual temperature sensitive automatic flow control valves may be used in association with each absorber reactor vessel but they are not an essential part of this invention.

As the dissociation reaction in the absorber-reaction vessel (3) tends to proceed to completion at lower pressures than that of the synthesis reaction in the reaction chamber (9), it is advantageous in some circumstances to provide in the circuit of the system a compressor in conduit (5') and a expansion engine in conduit (12') preferably adjacent to the separator, thus ensuring a higher pressure in (9) than in (3).

The ammonia from the separator (6) passes through conduit (12) into the first heat exchanger to the absorber-reaction vessel (3). Provision may be made for adding or removing ammonia or nitrogen and hydrogen to the system through for example conduits (13) and (14). If desired nitrogen and hydrogen from separator (6) may be stored and recombined at a suitable time in which case suitable storage facilities for the resulting ammonia should be provided.

For the sake of clarity, only one mirror-collector is illustrated in FIG. 1. However additional pairs of conduits, each pair comprising adjacent conduits (5) and (12), have been shown and these are connected to two other mirror-collectors (not shown) with components (1) to (4) similar to those illustrated. Each mirror-collector is connected to its respective pair of conduits (5) and (12) in the same manner as the mirror-collector illustrated.

Similarly many other mirror-collectors may be connected to the system so that the fluid outflowing from (6) in conduit (12') divides approximately equally (in the case of identical mirror-collectors) among all conduits (12), and the returning fluid from all conduits (5) coalesces to form the stream in (5') inflowing to (6).

In FIG. 4 arrows (20') and (21') indicate the direction of fluid flow in the passages (20) and (21) respectively and illustrate that the flow directions are countercurrent.

Figure 1A:
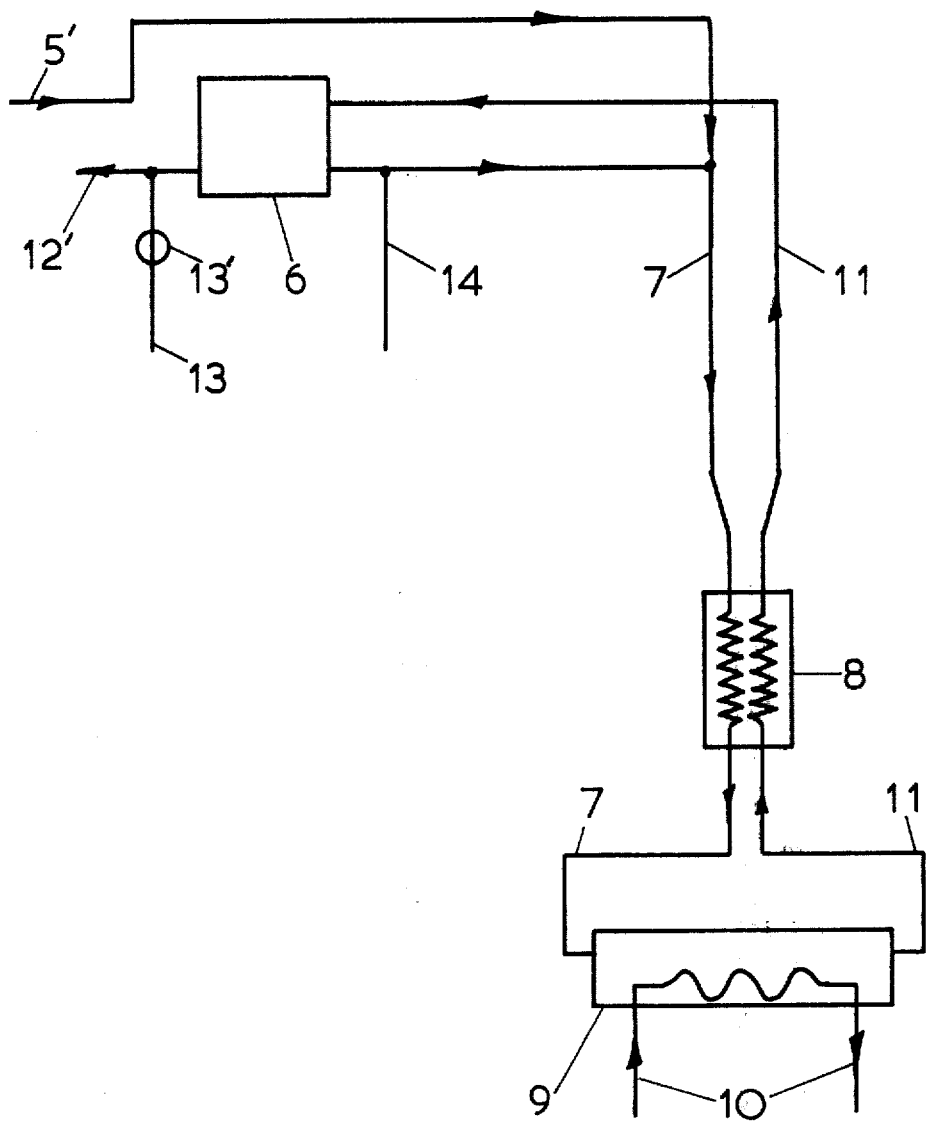
FIG. 1(a) shows an alternative layout of the components (5'), (6) to (11), (12'), (13) and (13') of FIG. 1 in which the separator receives fluid only from conduit (11). The second heat exchanger (8) is not an essential component of this invention in its general form.
Figure 2:
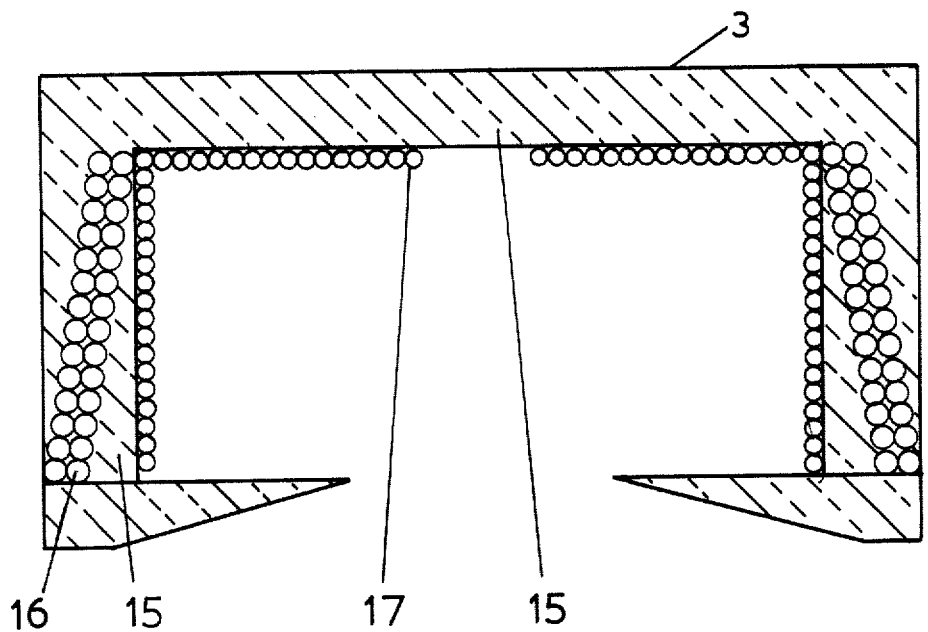
FIG. 2 shows the absorber reactor (which may be of any form described) with the addition of a heat exchanger comprising a continuous coil of tubing (16) which with advantage may be located within the insulation (15) with one end adjacent to the colder outside container and the other adjacent to the hot interior of the absorber reactor that is close to tubes (17).
Figure 3:
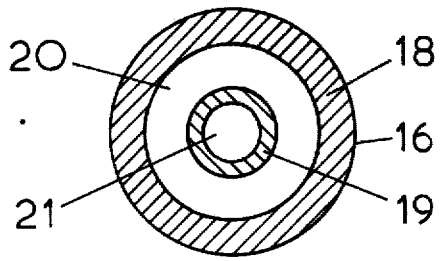
FIG. 3 illustrates a possible cross-section of tubing (16) in which (18) is an outer thick walled tube (thick to withstand the pressure) and (19) is a thin walled inner tube. The incoming and outgoing reactants flow in the two spaces (20) and (21) and heat is transferred across wall (19).
Figure 4:
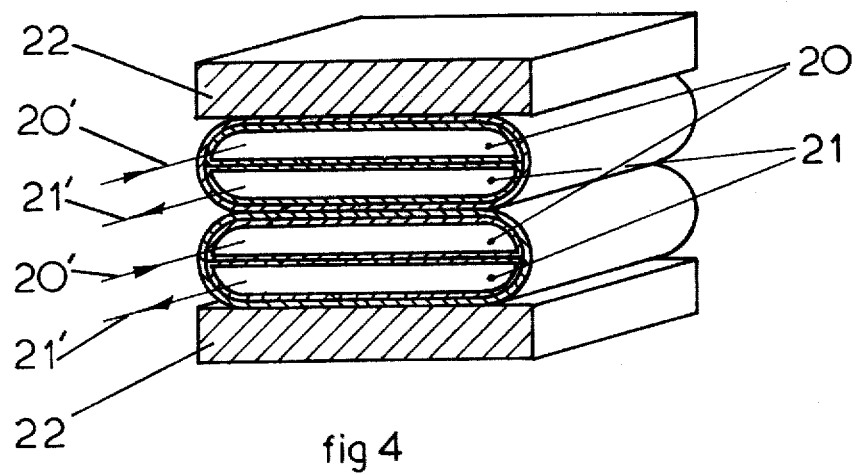
FIG. 4 shows an alternative arrangement in which the passages (20) and (21) are coalesced.
Figure 5:
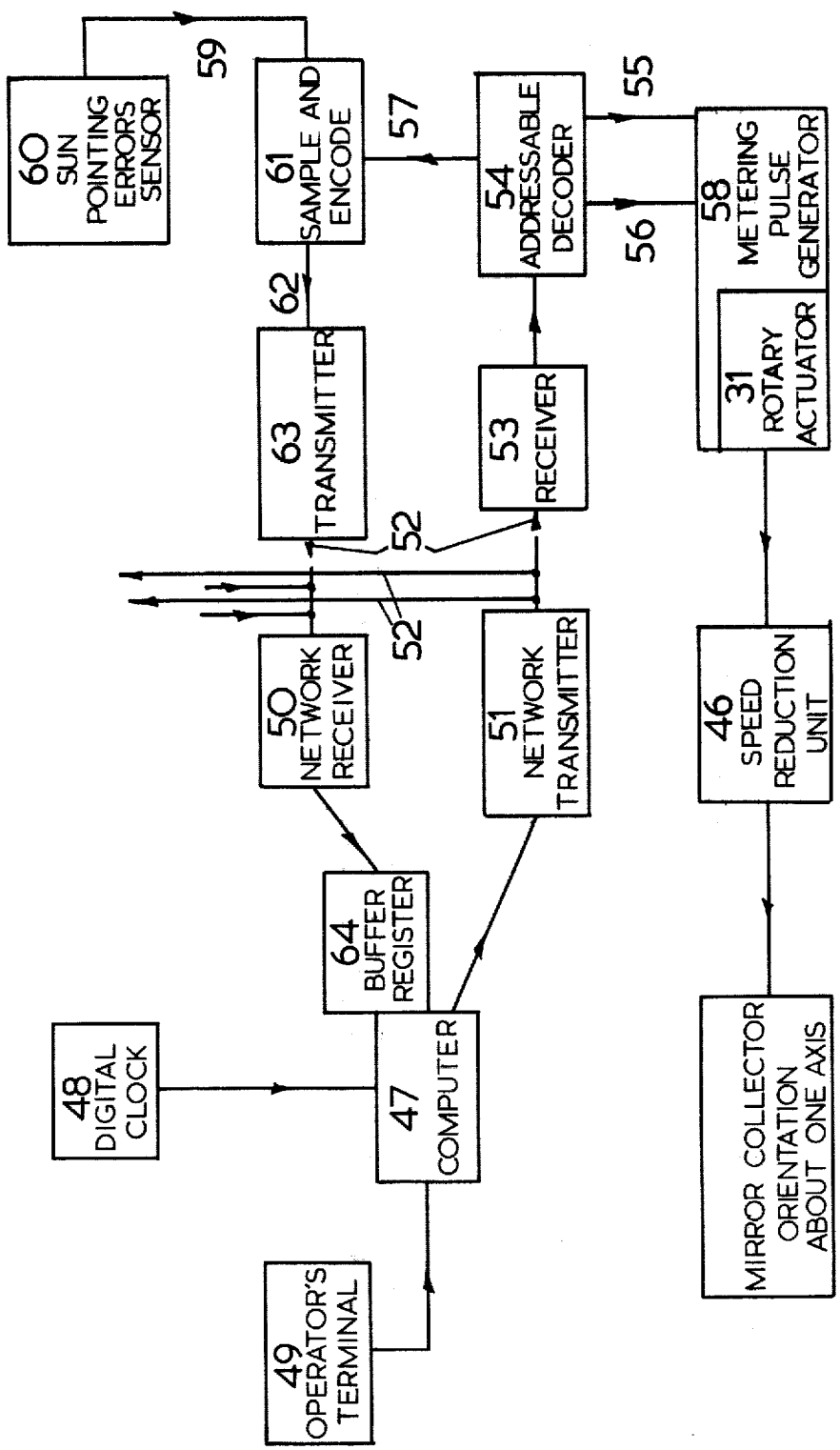

FIG. 5 shows in detail the means operable from a master control for controlling the solar radiation focussing apparatus, as mentioned above. In this figure rectangles symbolise components or systems, and arrows symbolise flow of data, commands, information or motion. More particularly, the orientation of the collector is achieved by turning the collector about the pair of axes (41) and (42) shown in FIGS. 9 and 10. Referring again to FIG. 5, the turning motion for each axis is produced by the rotary actuator (31) acting through the speed reduction unit (46). The items (47) through (52) describe the master control itself and it is convenient, for the purposes of explanation, to begin with the master control. Computer (47) receives accurate time of year information from the high resolution digital clock (48) and also receives data from standard input hardware including the operator's terminal (49), and additionally from network receiver (50). The computer (47) is programmed to calculate rotary actuator speeds appropriate for each axis of each mirror collector and also appropriate for designated equispaced times, such speeds being calculated to cause the orientation of each mirror collector to assume optimum orientation for concentrating solar energy on to its absorber-reaction vessel. The computer is also programmed to append to this data, address or other identification codes, as well as executive and timing codes appropriate for the associated mirror and actuator, and to transmit it via transmitter (51) and the common communication network (52). This latter may be any conventional two-way means of communication, e.g. using cables, electromagnetic radiation, sound or visual signals.

At each mirror collector, and coupled to the network (52), is a receiver (53) which passes the stream of data emanating from (51) to an addressable decoder (54). This is, according to conventional practice, essentially a shift register with associated digital comparators designed to react to specified digit sequences, e.g. the sequence specifying the mirror address, sequences that appear at regular intervals and which may therefore be used for timing, sequences which are executive in nature in that they actuate specific circuits according to established techniques. Consequently, in the example we are describing, addressable decoder (54) gives rise to regular equispaced timing pulses (55), actuator commands (56) which are binary numbers representing actuator speeds for an ensuing interval of time, and read sensor commands (57). The data streams (55) and (56) enter the metering pulse generator (58) which in this instance contains the rotary actuator (31).

Component (58) is designed, according to practice, to produce a train of metering pulses, i.e., electronic signals conventionally in pulse form, such that the number of signals produced between consecutive pulses (55) bears a constant proportional relationship to the last speed command (56), and also, so that the number of signals produced over a large number of consecutive intervals between pulses (55) bears the same constant proportional relationship to the sum of all associated speed commands (56). In this summation each interval between pulses (55) must be associated with the last received speed command. Elsewhere in this specification this summation is called the time integral of the speed commands. In the example being described, the rotary actuator (31) with a shaft driven conventional pulsing device (e.g. cam operated switch) is part of the metering pulse generator, and the metering pulses are produced by the said shaft driven pulsing device. Thus the shaft speed of this rotary actuator is proportional to the associated actuator speed command.

In another form of (58), the device is wholly electronic and the metering pulses are used to drive a detached conventional stepping motor employed as rotary actuator (31).

At intervals, according to the computer program, addressable decoder (54) presents a read sensor command at output (57). Upon receipt of this command, the analogue data (59) from the sun pointing error sensor (60) is sampled and encoded as pulse interval modulated signals by the conventional means (61) described briefly under the section headed sun pointing error sensor. The same signal (57) causes this data (62) to be transmitted by transmitter (63) across the communication network (52).

In another form the sun pointing error sensor presents visual data which is viewed by a television camera common to a number of mirror collectors. In this case the television signals may travel by separate link to the master control which may have an additional computer to decode the television signals according to established pattern recognition techniques. In this case also the control of the television camera will come directly from the master control and will be in the form of a camera pointing directive.

Whenever a command (57) appears, it will be in accordance with a programmed and addressed instruction transmitted from (51). Thus the consequent signals received by receiver (50) are assigned the same address and are employed to monitor the sun following, or other designated performance of the addressed mirror collector. As will be described, this data is generally used in a correlation program designed to correct a set of parameters unique to each mirror collector which parameters allow the calculation of any geographic or celestial direction in terms of the altitude and azimuth co-ordinates of each mirror collector, and thus enable the calculation of appropriate actuator speeds to effect any specified orientation, e.g. orienting for the protective position illustrated in FIG. 11 or orienting to face the sun even if the sun is temporarily hidden by a cloud.

Conventional techniques are used in the design of the metering pulse generator (58) of FIG. 5. For example, the numerical speed data (56) is stored in a register R1 (updated whenever new data appears at (56)) and a counter C1 is designed so that numeral one is subtracted from its count on receipt of each metering pulse. (For the sake of clarity in this description the designations R1, C1, etc. are used. The devices so designated are not referred to elsewhere in this specification and are not included in any illustration of this specification). A comparator sends signal S1 whenever the digits in C1 are all zero and it is arranged that S1 will immediately read into C1 the digits stored in R1. It is further arranged that upon receipt of each regular time signal (55) either: (a) the number in C1 is read into a second register R2, (b) zero is read into R2, or (c) double the number in C1 is read into R2 (arranged by displacing the bits one place). R2 is coupled to a digital-to-analogue converter and conventional power amplifier which latter powers the rotary actuator (in this instance a direct current motor). A second counter C2, capable of counting forwards or backwards, adds numeral one upon receipt of a timing pulse (55) and subtracts one on receipt of S1. The number in C2 may normally be for example 4 in which case condition (a) above will be implemented. If, however, C2 reads less than 4, i.e. the actuator is revolving too quickly, condition (b) is implemented. Finally, if C2 reads greater than 4, condition (c) is implemented.

Normally C2 reads 4 and fine corrections in actuator speed are implemented through the variation in number read into R2 from C1. Refinements are required to this design, according to established practice in order to ensure stable operation, reversible operation, and to deal with zero speed commands.

Speed Reduction

Although conventional speed reduction may be employed for item (46), a friction driven speed reduction unit as described herein may be alternatively employed with advantage since it is generally less expensive and free from backlash. Additionally, it is less prone to damage and the apparent disadvantage of possessing a non-specific ratio is of little consequence because the ratio may be regarded as an extra mirror collector parameter amenable to computation by employing correlation techniques as will later be described.

FIG. 6 illustrates such a friction driven reduction unit. Components (23), (30), (29) and (27) are coaxial with common centre-line as shown. (26) is one of a set of hardened cone wheels with shafts carried in bearings in (23). Thus the axes of (26) are stationary with respect to (23), and as (26) rotates, (27) and (29) rotate in opposite directions to one another. (26') is one of another set of cone wheels almost identical to set (26) whose shafts are carried in (30). If the angles associated with (26') were identical to those of (26), the axes of (26') would also be stationary with respect of (23), however slight differences in the angles cause relative motion between (23) and (30)—the ratio of this difference and the actuator speed is determined by the formula given $$\frac{\text{Input speed (actuator)}}{\text{Output speed}} = \frac{W(F_1 + 1)(F_1 - 1) F_2 \cos \theta}{F_1 - F_2}$$

Where
$F_1 = \tan \theta_1 / \tan \phi_1$
$F_2 = \tan \theta_2 / \tan \phi_2$
W is the worm ratio (W 1)

The desired friction between wheels is obtained by means of springs (24) and (28) and the wedging action due to small angle $\phi$. The maximum output torque is determined by this friction force and the number of wheels in the sets. The backlash is determined by the slack in the cone-wheel bearings.

Sun pointing error sensor

Three preferred forms of the device (60) in FIG. 5 are further illustrated in FIGS. 7(a), 7(b) and 7(c). Each of these preferred forms comprises desirably the following elements:

(a) shading means (35), e.g. a disc
(b) photovoltaics (37)
(c) reflector—(optional) (2) or (2')

In principle, the edge of the shadow of the shadow disc (35) is graded in intensity due to the penumbra (36). A photovoltaic (37) smaller in dimensions than the proximate width of this penumbra and placed in the penumbra zone, will experience changes in intensity for small changes in position of the shadow. Thus, by detecting light intensity changes in the penumbra, signals may be generated which indicate the relative location of the sun. As shown in FIG. 7, such signals from the sensors (37) will vary as the deviation of the sun's rays from the direction of axial symmetry, and from these variations, pointing error signals may be easily obtained.

Desirably if a mirror (2) (or (2') in the general case) is to be steered to face the sun, the mirror itself is used for element (c). The photovoltaics as a consequence may be placed under or near to the rim of the shadow disc and the shadow disc may be attached to the absorber reactor (3) as shown.

One advantage of this scheme over alternatives is that no precise alignment or adjustment of the elements relative to the mirror is required.

A sample and encode device (61) of FIG. 5 is associated with each sun pointing error sensor and located in proximity to it. It comprises:

(d) an electronic ramp generator (automatically resetting)

(e) a voltage comparator and pulse generator (which transmits a pulse on finding equal voltages)

(f) a means of switching the sensor photovoltaic elements to (e) in sequence.

This circuitry is conventional for producing pulse interval modulated data, i.e. a train of pulses the interval between which is proportional to the numerical value of the data encoded. The data is demodulated in receiver (5) of FIG. 5 as follows.

The time intervals between the aforesaid pulses are measured and converted to digital form. A convenient and conventional method of doing this is to arrange for the arrival of each pulse to cause in sequence the entry of the relevant precise time (according to clock 48) into the set of buffer registers (64). The computer (47) is programmed to subsequently extract the difference between these recorded times and thus calculate the original photovoltaic signals. Further standard computation involving the relative magnitudes of these signals provides the error co-ordinates.

Figure 8:
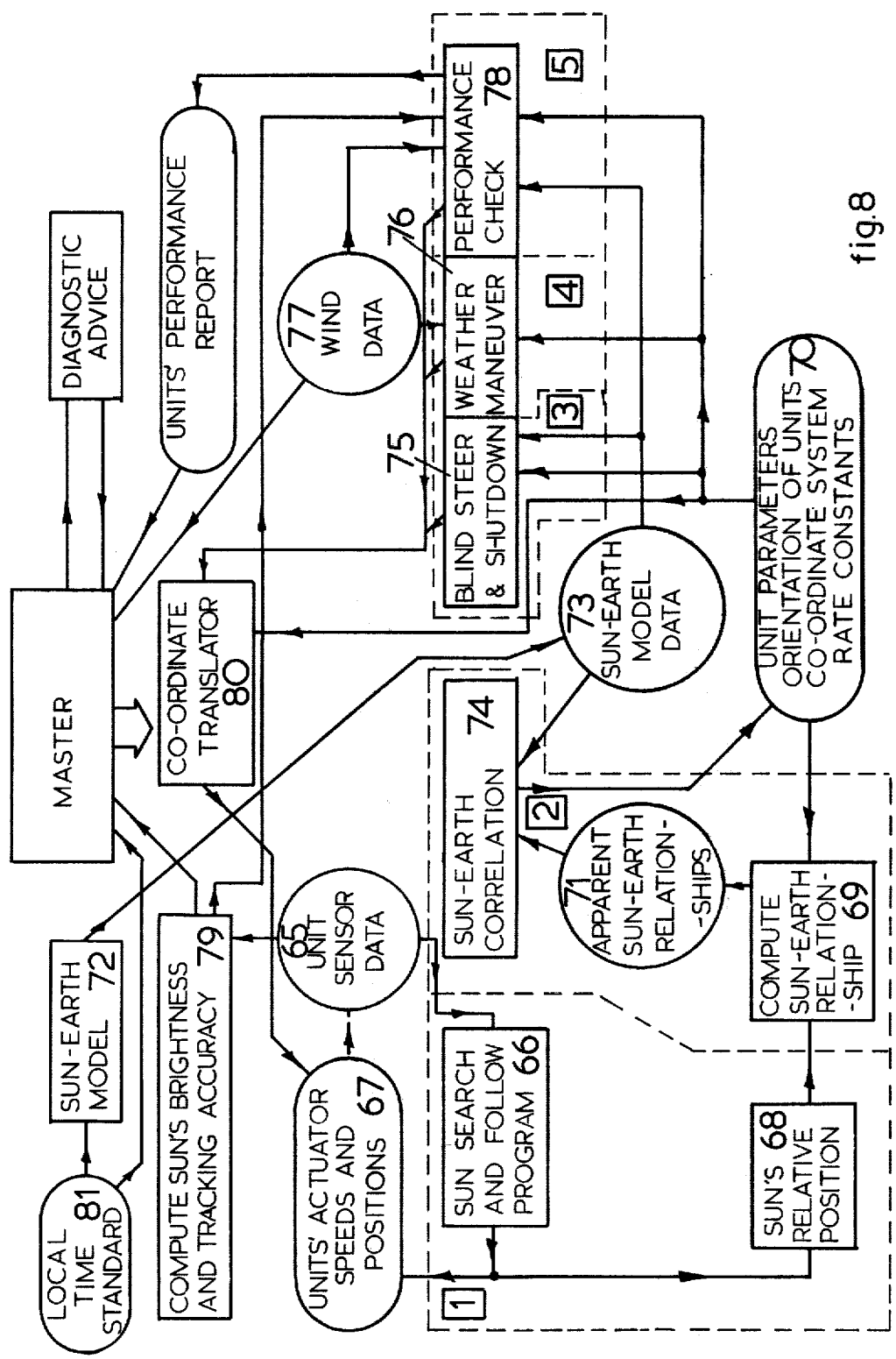

FIG. 8 specifies the computer programmes in terms of salient functions and data interchanges. In this diagram, rectangles represent programmes or routines while circles and ovals represent data or information blocks.

The dashed lines delineate groups of programmes and data herein referred to as partitions. Each partition is associated with a specific mode of operating the computer and master control system and those items outside the partitions are common to each. In FIG. 8 the word 'unit' is employed to denote a single mirror-collector with associated actuators, etc. and possessing unique parameters which may be:

(a) orientation of azimuthal axis (not necessarily exactly vertical)—two parameters (b) zero position for azimuth and elevation—two parameters (c) speed reduction ratio—one parameter (d) orthoganility of two axes—one parameter Partition (1) operates as follows whenever the sun is shining. Data (65) derived from the sun pointing error sensor enters programme (66). If the pointing error is very great, and therefore indeterminant except for the direction of error, a mode of operation appropriately termed the search mode may be employed in which programme (66) causes actuator speeds (67) to be computed which are designed to sweep the orientation over a wide path in order to intercept the sun's position. During this operation and in all others involving programme (66), whenever data (65) indicates close sun following, i.e. it is of a nature that actual pointing errors may be computed (in practice errors less than 5 milli radians using the pointing error sensor described herein), programme (68) computes the sun's position relative to the unit's own azimuth and elevation co-ordinates as determined by time integration of the actuator speed commands (67).

In partition (2), programme (69) receives data from (68) and also the parameter data (70) previously described under (a) to (d) above. It is to be emphasised that data (70) is essentially assumed data since slow changes due to settling of foundations, wear, etc. or slip in the speed reduction unit may occur, all of which will alter the true values of data (70). When first bringing a mirror collector into operation there may be quite large differences between the assumed data (70) and the true values. Partition (2) is essentially aimed at checking the assumed values and correcting them. Thus programme (69) employs the assumed data (70) to compute an apparent sun position (71) in a co-ordinate system common to all units, e.g. a co-ordinate system based on geographic north-south and local zenith (herein referred to as the universal co-ordinate system). Concurrently programme (72) labelled sun-earth model employs data (81) from the digital clock (48) of FIG. 5 and the known equation of motion of the sun relative to earth to compute the actual position of the sun, data (73). The two sets of data, (both related to the universal co-ordinate system) are now compared in programme (74) which is a standard correlation programme. Programme (74) may be iterative with data (70) in order to obtain optimum values of (70) and will normally operate on extensive sets of data (71) and (73), e.g. data collected over one day.

An important mode of operation is that designated in partition (3) with associated input of data (73). Programme (75) operates in universal co-ordinates and is designed to orient mirror-collectors in any desired direction, e.g. to follow the sun (even when temporarily hidden from view) or to point it in the direction of the rising sun next day.

Figure 11:
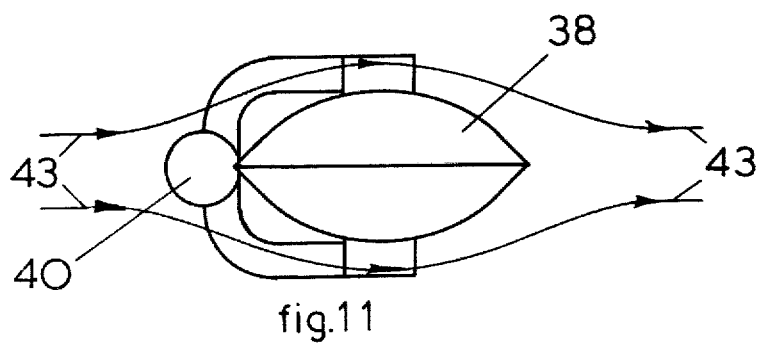

This mode is further developed in partition (4). An example of the performance of programme (76) in partition (4) is as follows. Suppose data (77) indicates a strong wind is developing from the north. A favourable orientation of two mirror-collectors would then be as depicted in FIG. 11, one mirror collector pointing east and the other west. Programme (76) is designed to effect such protective maneouvres.

Lastly, partition (5) and programme (78) is to aid maintenance of the units. Two examples are given below to illustrate the operation of (78).

(a) data (70) is employed to check the stability of the foundations of each mirror by observing changes in orientation of azimuth axis. (It is cost effective to make foundations as cheaply as possible foregoing some stability). Actuator speed commands may be computed to deliberately shift the load on the foundation in a manner designed to measure its stability.

(b) mirror reflectivity may be checked by comparing data from (79) with the isolation component of data (77). Programme (79) sums the phototransistor outputs of the pointing error sensor when the pointing error is small. It thus produces a measure of reflected sunlight (i.e. if the mirror is an element of the pointing error sensor).

(c) individual photo-transistors of the pointing error sensor may be checked by programming deliberate deviations from zero pointing error in order to place the photo-transistors in sunshine or shadow.

Outputs of each partition (3), (4) and (5) are translated to individual unit altitude-azimuth co-ordinates by programme (80) using data (70) and known mathematical formulae. Appropriate unit actuator speeds (67) are then computed by (79) and transmitted. The block labelled master in FIG. 8 represents the human operator aided possibly by further supervisory programmes. Inputs of data to the master are shown, e.g. diagnostic advice from written material and unit's performance report which may be a printed output resulting from a routine procedure programmmed in (78).

Not all the programmes referred to in FIG. 8 are essential to this example of a means operable from a master control. A minimum requirement is for programmes (72), (75) and (80) with associated data and these are in accordance with well-established mathematic formulae and programming techniques. In a simple form of this invention data (70) is obtained from physical measurements, and performance is monitored by observation of data (65).

In an alternative simple form programme (66) outputs only calculated actuator speeds in a simple conventional servo system.

Figure 9:
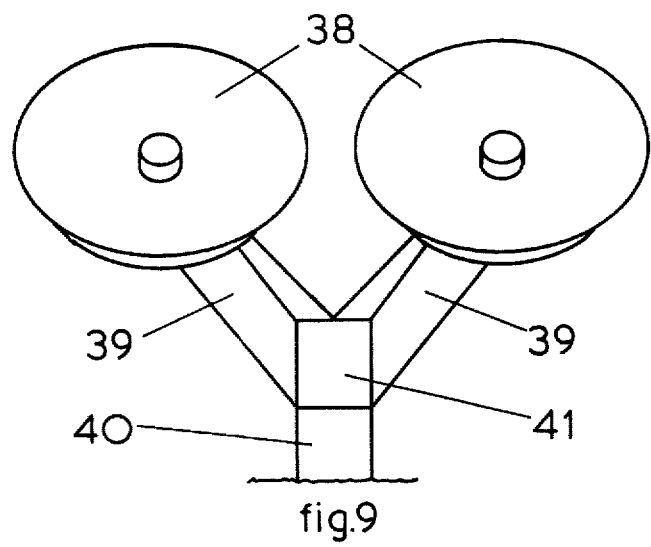
Figure 10:
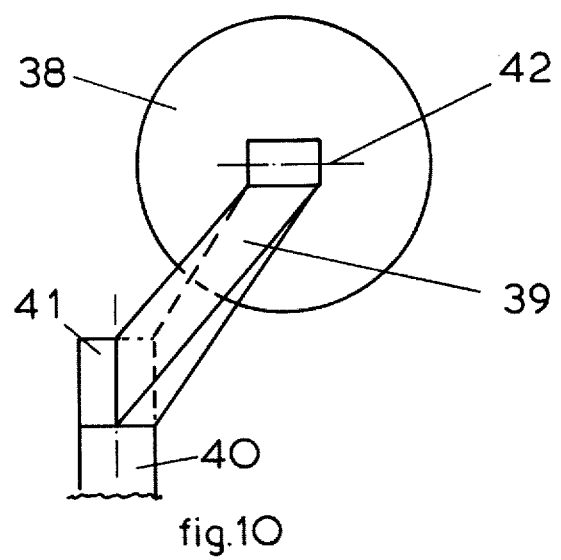

Turning now to FIGS. 9 to 11, the mirrors are indicated by numeral (38) and the supporting arms and common fixed frame by (39) and (40) respectively. The common axis of rotation of the mirrors is shown by numeral (41). Numeral (42) indicates the axis of rotation of one mirror about an arm. Air flow lines around the structure are depicted by numeral (43). Advantages of the mirrors being adapted to close together as shown in FIGS. 10 and 11 is that they shelter each other and thus the combination offers only small aerodynamic resistance in wind storms and also diminution of erosion of the surface of the reflectors in sand and dust storms.

Figure 12:
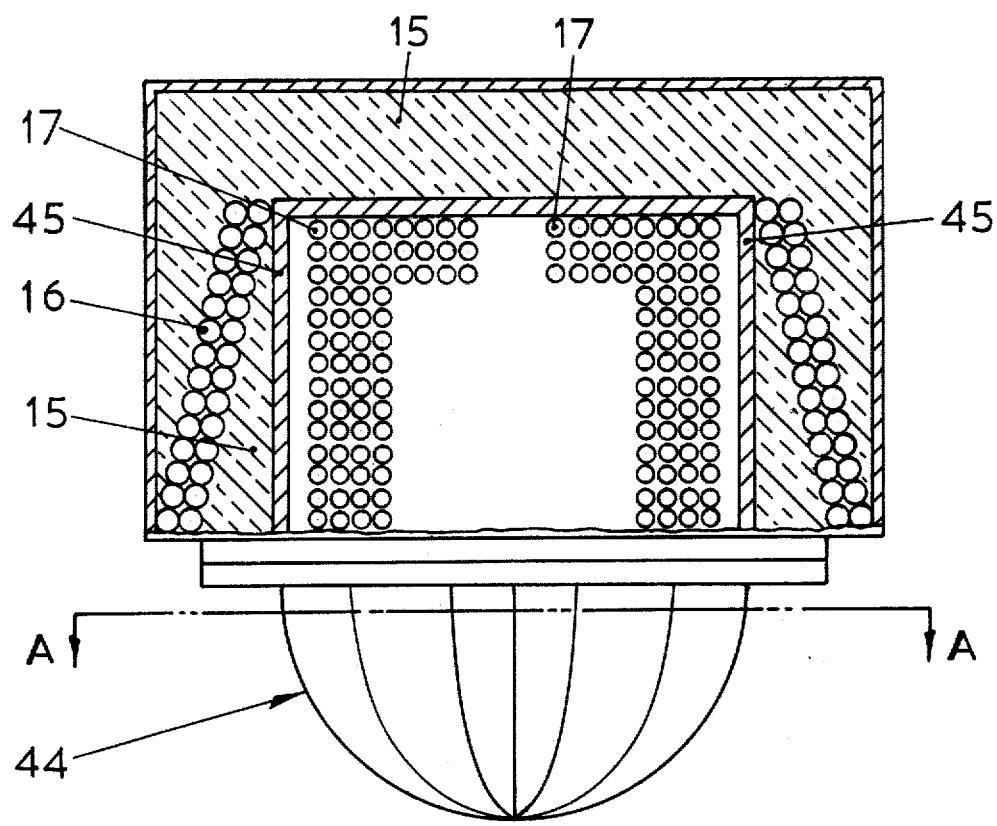
Figure 13:
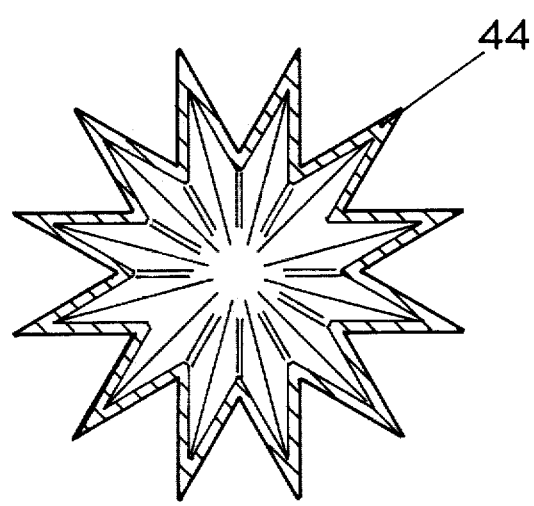

FIG. 12 is an alternative absorber reactor in which solar radiation falls on (44) which has the form of a number of hollow vanes of circular outline manufactured as a single pressing or casting. The flange of (44) is sealed against a matching flange on (45) so that the interior of (45) and of (44) form a continuous space which may contain sodium or its alloys. The purpose of sodium or its alloys is to transfer heat from the solar heated surface of (44) to the surface of the tubing (17) using the principles of the heat pipe. In this instance there is an advantage in omitting the customary wick or restricting its use because then gravity will not allow substantial reverse flow of heat when the solar radiation falls to low values.

This invention is not limited to the speed reduction unit specifically described with reference to FIG. 6, but includes any means for altering speed which comprises a set of rings, wheels, rollers and/or balls and means for pressing or forcing components together to enable the transfer of motion between components by friction at their zones of contact as well as conventional methods of speed reduction.

Catalysts of conventional type may advantageously be used in the dissociation and synthesis of ammonia. Conventional materials of construction may be used in the various components of the system.

For the purposes of this specification it is intended that the term paraboloidal mirror includes an elliptical, preferably circular paraboloidal mirror as well as a parabolic preferably cylindrical parabolic mirror.

The sensor described earlier in this specification is novel per se. Another use of the sensor is to associate it with a heliostat. Thus it may be mounted in a fixed position adjacent to a heliostat so that some of the sun's rays after reflection from the heliostat are directed to the sensor and this provides a measure of the angular deviation of the reflected rays from a desired direction defined by the axis of the sensor.

It is understood that in prior art methods each detector e.g. a solar cell, is extensive, for the output of each detector is determined by the fraction of the area of its sensitive surface which is illuminated or shaded.

In contrast, the detectors in the sensor described in this invention may, in principle, be point detectors whose purpose is to detect the intensity of radiation at points within the penumbra of a shadow.

Consequently the essential feature of this sensor is that the finite aperture of each detector when measured perpendicular to the direction of a ray entering the aperture is limited in extent to that required for the variation in intensity within the aperture to be always small compared to the variation in intensity within the penumbra.

For the purposes of describing the sensor in this invention it is convenient to define an axis relative to which the angular deviation of the sun's rays may be measured, the said axis being such that when approaching rays derived from the center of the sun's disc are parallel to this axis the angular deviation of the sun's rays is defined as zero.

The sensor in this invention comprises usually symmetrical means of casting a shadow, and at some distance from it, means (usually two or more) for detecting solar radiation. The detecting means are usually located so that, when the angular deviation is zero, they are dispersed within the penumbra each being identically disposed with respect to contours of constant intensity within the penumbra. It is emphasised however that such symmetry and such identical disposition are not essential features of the sensor in this invention nor is it a requirement that the detecting means be within the penumbra when the angular deviation is zero.

A sensor according to this invention and suitable for operating in conjunction with a heliostat may comprise a 50 inches long tube of outside diameter 2 inches open at each end, a shadow ring of outer diameter 4 inches fitted around the tube at one end (end A) and concentric with it, a screen ring of outer diameter 6 inches fitted to the other end of the tube (end B) and also concentric with the tube, each ring having two parallel plane faces spaced about 0.2 inches. Four equispaced holes are drilled in the screen ring parallel to the common concentric axis and on a pitch circle whose diameter is 3.6 inches. The diameters of these holes are 0.1 inches. Fitted into each hole is a photo transistor whose light sensitive surface faces end A. Fitted around the screen ring and concentric with it may be fitted a second tube whose purpose is to shade the photo transistors from direct radiation from the sun.

The operation of this sensor is as follows: the 50 inch tube is aligned with the receiver upon which the radiation reflected from the heliostat is to be directed, end B being the nearer to the receiver. This may be achieved for example, by sighting through the bore of the 50 inches tube. When the heliostat is orientated so that the reflected radiation is directed with zero angular deviation from the desired direction, the penumbra of the shadow on the screen ring will be approximately 0.5 inches wide and the intensity of radiation on each photo transistor will be close to zero. When the orientation of the heliostat is altered by a small amount from this orientation the reflected radiation will deviate from the desired direction and this will result in a displacement of the penumbra relative to the photo transistors. Consequently some of the transistors will experience an increased intensity. The resulting changes in the electronic outputs of the transistors are a measure of the deviation of the reflected radiation from the desired direction.

Alternatively, the sensor described in the foregoing may be mounted on a paraboloidal mirror and coaxially with it.

It may be noted that in the above example the dimensions of the detectors are small in comparison to the widths of the penumbra in the vicinity, namely approximately one fifth.

Advantages

In prior art methods where solar cells are used they must be used in a near short circuit mode in order to extract a signal approximately proportional to the fraction of surface illuminated. In consequence, output voltages are a fraction of a volt. Other prior art methods employ optical elements usually lenses. The sensor of the present invention does not require any optical elements and may employ photo elements which are less expensive than solar cells and which produce output signals of several volts.

What I claim is:

1. A device for sensing small angular deviations in the direction of sunlight comprising:
   (a) means for casting a shadow having a penumbra in rays originating from the sun;
   (b) solar radiation detecting means, with an aperture so restricted in shape and size as to enable it to be enveloped by the penumbra of the shadow, for detecting the intensity of radiation in the penumbra and for generating an electrical signal representative of the detected intensity;
   (c) means for locating the aperture of the solar radiation detecting means within the penumbra; and the restriction in shape and size of the aperture and its location being such that the variation in intensity of radiation within the aperture is less than the variation in intensity within the penumbra.

2. For use in a solar energy collection system including a heated fluid which dissociates endothermically and recombines exothermically, and a mechanism for focusing solar radiation on to an absorber reaction vessel in which the said fluid dissociates, a device for sensing small angular deviations in the direction of sunlight comprising:
   (a) means for casting a shadow having a penumbra in rays originating from the sun;
   (b) solar radiation detecting means, with an aperture so restricted in shape and size as to enable it to be enveloped by the penumbra of the shadow, for detecting the intensity of radiation in the penumbra and for generating an electrical signal representative of the detected intensity;
   (c) means for locating the aperture of the solar radiation detecting means within the penumbra; and the restriction in shape and size of the aperture and its location being such that the variation in intensity of radiation within the aperture is less than the variation in intensity within the penumbra.

3. A device according to claim 1 or 2, wherein the rays emanate directly from the sun.

4. A device according to claim 1 or 2, wherein the rays are reflected rays.

5. A device according to claim 1 or 2, wherein the rays are refracted rays.

6. A device according to claim 1 or 2, wherein said aperture is non-circular.

7. A device according to claim 1 or 2, wherein said aperture is circular.

* * * * *